United States Patent
Agarwal et al.

(10) Patent No.: US 8,671,388 B2
(45) Date of Patent: *Mar. 11, 2014

(54) SOFTWARE DEVELOPMENT AND PROGRAMMING THROUGH VOICE

(75) Inventors: Sheetal Agarwal, Maharashtra (IN); Arun Kumar, Noida (IN); Priyanka Manwani, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 327 days.

This patent is subject to a terminal disclaimer.

(21) Appl. No.: 13/016,293

(22) Filed: Jan. 28, 2011

(65) Prior Publication Data

US 2012/0198418 A1 Aug. 2, 2012

(51) Int. Cl.
*G06F 9/44* (2006.01)

(52) U.S. Cl.
USPC ........... 717/106; 717/105; 717/107; 717/108; 717/109; 717/113

(58) Field of Classification Search
USPC ................................................. 717/100–122
See application file for complete search history.

(56) References Cited

U.S. PATENT DOCUMENTS

| | | |
|---|---|---|
| 4,582,441 A | 4/1986 | Carter et al. |
| 5,875,429 A | 2/1999 | Douglas |
| 5,915,001 A | 6/1999 | Uppaluru |
| 6,026,433 A | 2/2000 | D'Arlach et al. |
| 7,260,530 B2 | 8/2007 | Werner |
| 7,369,996 B2 | 5/2008 | Sladden |
| 8,275,099 B2 * | 9/2012 | Agarwal et al. ............ 379/88.17 |
| 2002/0077823 A1 | 6/2002 | Fox et al. |
| 2003/0055651 A1 | 3/2003 | Pfieffer et al. |
| 2003/0139928 A1 | 7/2003 | Krupatkin et al. |
| 2004/0047453 A1 | 3/2004 | Fraser |
| 2006/0048092 A1* | 3/2006 | Kirkley et al. ................ 717/100 |
| 2007/0213980 A1 | 9/2007 | Danner |
| 2009/0254347 A1 | 10/2009 | Moore et al. |

FOREIGN PATENT DOCUMENTS

KR 20020049861 6/2002

OTHER PUBLICATIONS

"Voice Code", 1 page, last updated on Feb. 15, 2006, available at http://web.archive.org/web/20080213071927/voicecode.iit.nrc.ca/VoiceCode/public/ywiki.cgi, available as of Dec. 1, 2010.
Print out of http:\\www.speechcomputing.com/programmingbyvoice, available as of Dec. 1, 2010.
Begel, Andrew et al., "An Assessment of a Speech Based Programming Environment", Sep. 4-8, 2006, pp. 116-120, VL/HCC 2006, IEEE Symposium on Visual Languages and Human-Centric Computing, Brighton, UK.
Arnold, Stephen C. et al., "Programming by Voice, VocalProgramming", Nov. 13-15, 2000, pp, 149-155 Assets '00, Proceedings of the fourth international ACM conference on Assistive technologies, Arlington, Virginia.
Kumar, Arun et al., "The Spoken Web—Software Development and Programming through Voice", Apr. 26-30, 2010, pp. 1371-1373, WWW'10, The 19th International World Wide Web Conference, Raleigh, NC, published by ACM, New York, NY, USA 2010.

* cited by examiner

*Primary Examiner* — Chuck Kendall
(74) *Attorney, Agent, or Firm* — Ference & Associates LLC (57) ABSTRACT

Methods and arrangements for employing telephonic voice commands in programming. A voice application is accessed and a program template is customized via selecting components from at least one palette. A program is created from the customized program template, and the created program is deployed and executed.

25 Claims, 4 Drawing Sheets

SOFTWARE DEVELOPMENT AND PROGRAMMING THROUGH VOICE

BACKGROUND

Challenges have long been presented in terms of according novice users the capability to carry out effective computer programming. Generally, efforts in response have focused more on the nature of the interface exposed to the novice user than on accessibility and convenience in general. When considering that only a small fragment of the human population has access to information systems enabled by computers, Internet and the Web, mere enhancements or improvements to conventional interfaces hardly represent a viable solution to meet the needs of larger numbers of users.

BRIEF SUMMARY

In summary, one aspect of the invention provides a method comprising: accessing a voice application; customizing a program template via selecting components from at least one palette; creating a program from the customized program template; and deploying and executing the created program.

Another aspect of the invention provides an apparatus comprising: at least one processor; and a computer readable storage medium having computer readable program code embodied therewith and executable by the at least one processor, the computer readable program code comprising: computer readable program code configured to access a voice application; computer readable program code configured to customize a program template via selecting components from at least one palette; computer readable program code configured to create a program from the customized program template; and computer readable program code configured to deploy and execute the created program.

An additional aspect of the invention provides a computer program product comprising: a computer readable storage medium having computer readable program code embodied therewith, the computer readable program code comprising: computer readable program code configured to access a voice application; computer readable program code configured to customize a program template via selecting components from at least one palette; computer readable program code configured to create a program from the customized program template; and computer readable program code configured to deploy and execute the created program.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments of the invention. One skilled in the relevant art will recognize, however, that the various embodiments of the invention can be practiced without one or more of the specific details, or with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
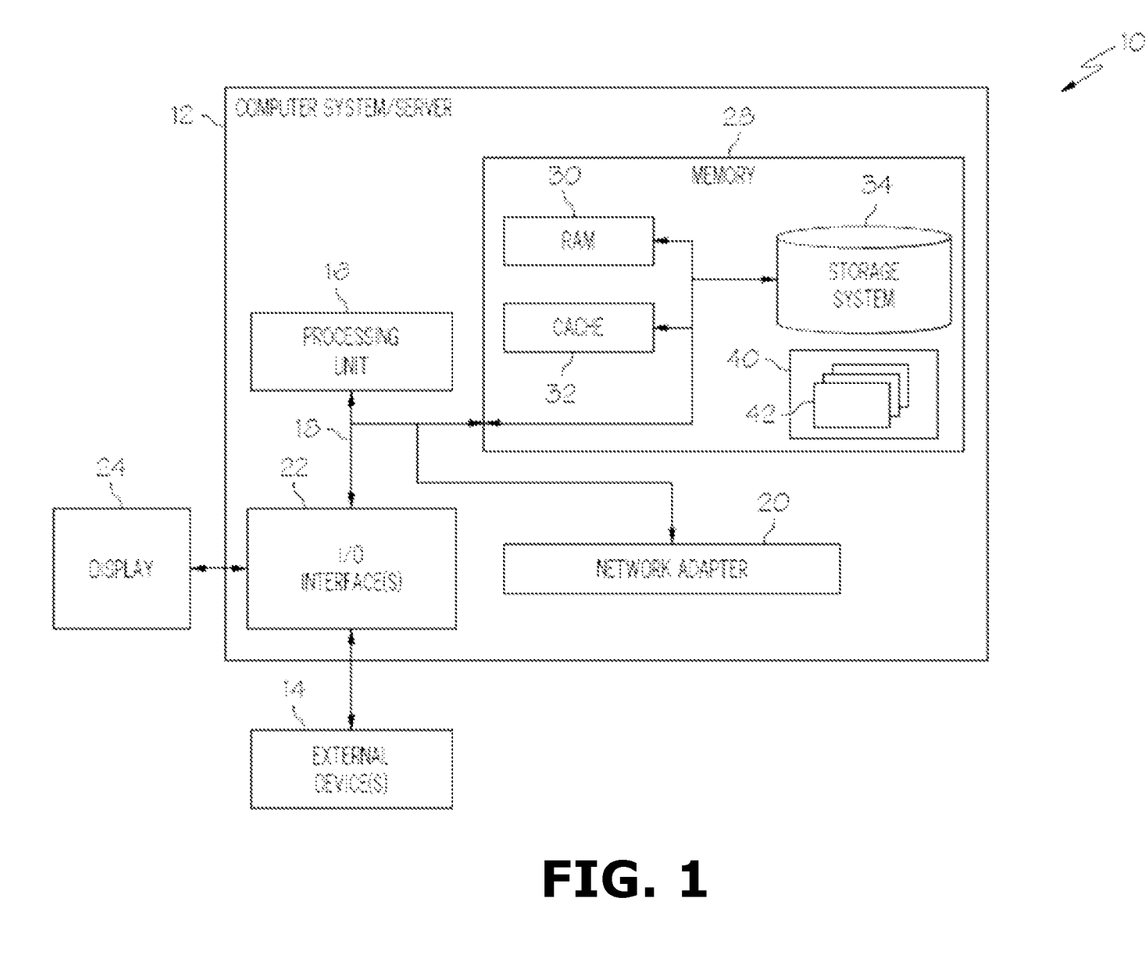
FIG. 1 illustrates a computer system.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In accordance with embodiments of the invention, computing node 10 may not necessarily even be part of a cloud network but instead could be part of another type of distributed or other network, or could represent a stand-alone node. For the purposes of discussion and illustration, however, node 10 is variously referred to herein as a "cloud computing node".

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, at least one processor or processing unit 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
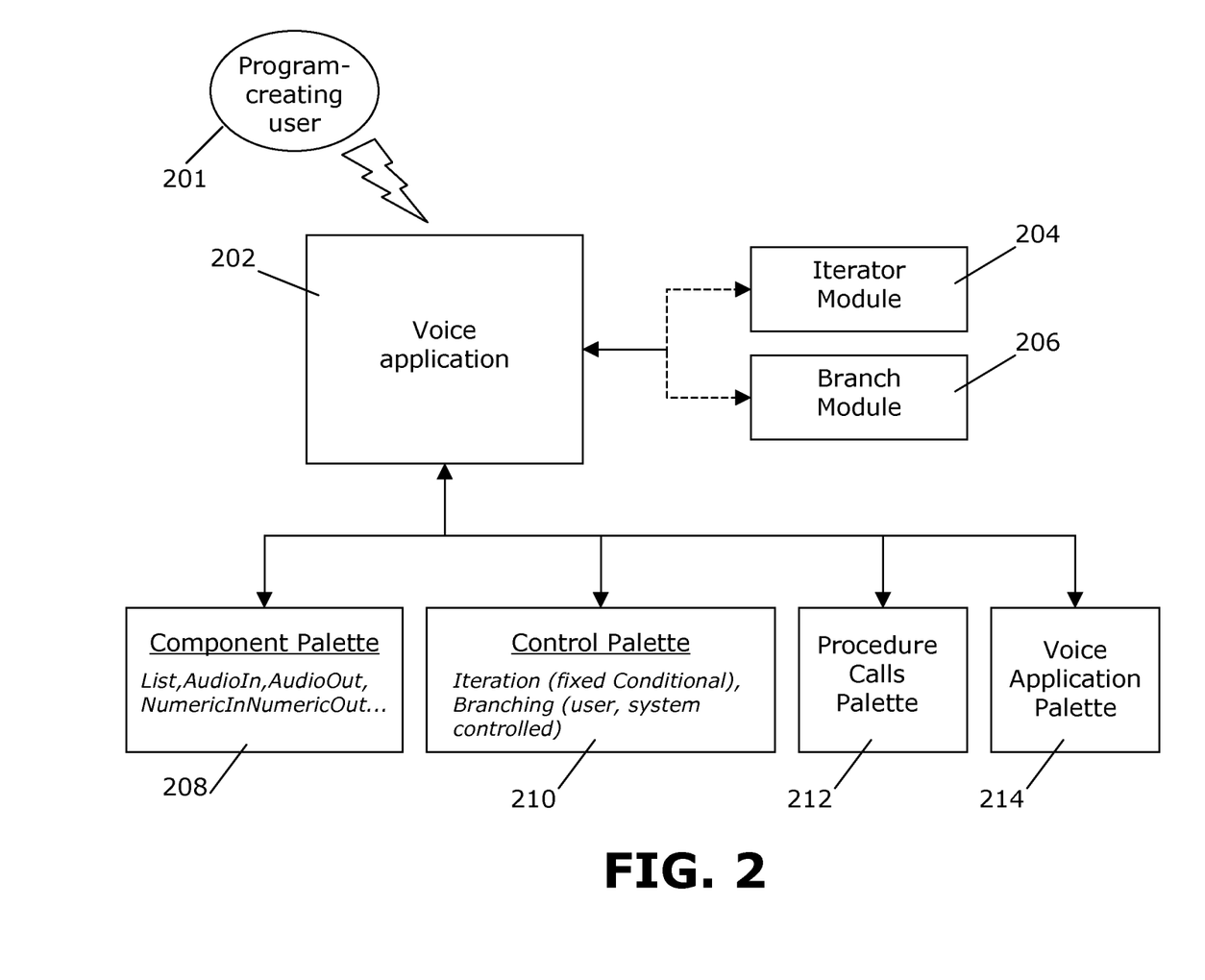
FIG. 2 schematically illustrates an arrangement for creating a program via a voice-based application.
Figure 3:
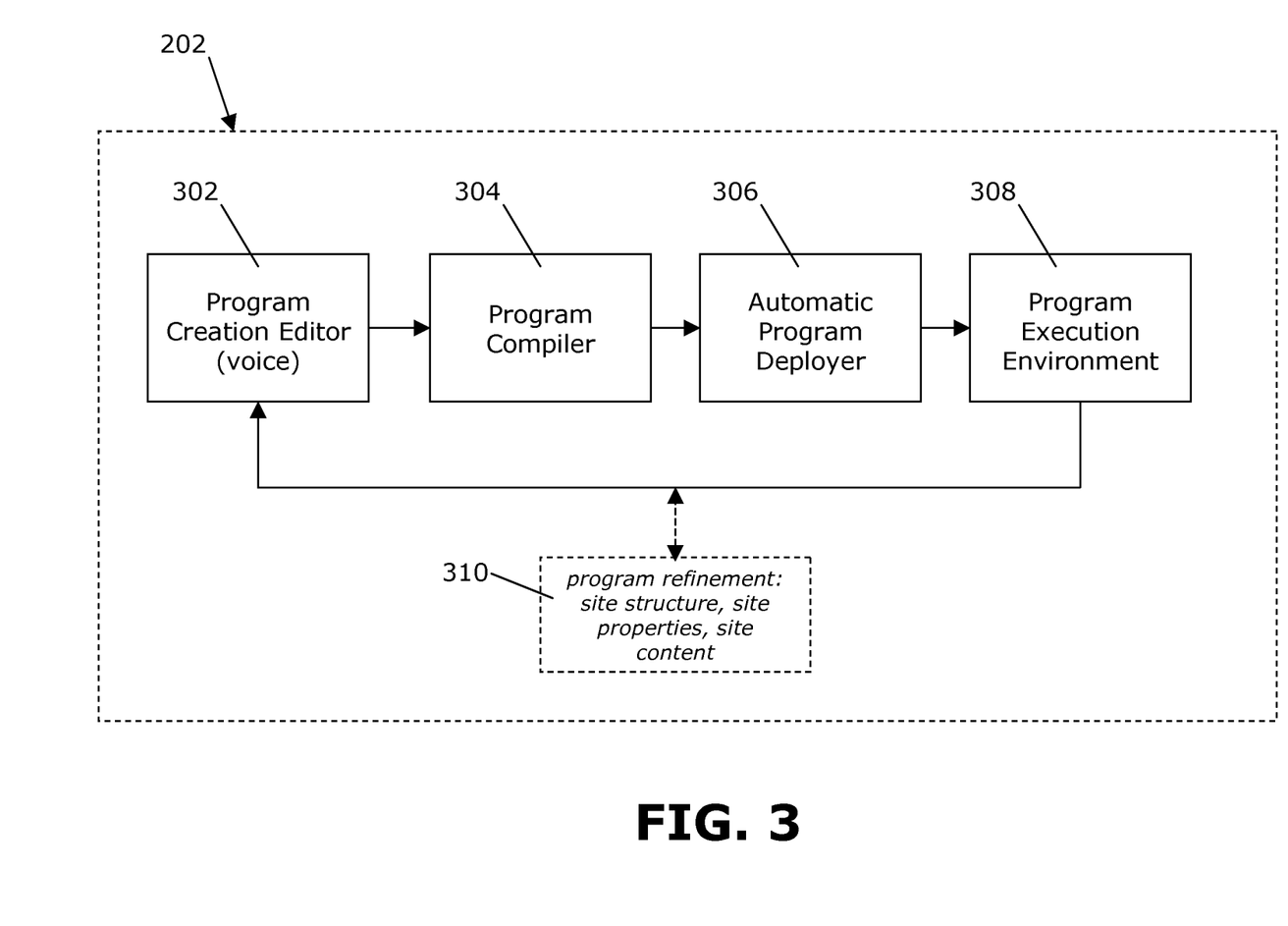
FIG. 3 schematically illustrates an arrangement for deploying and executing a program in a voice-based application.

The disclosure now turns to FIGS. 2 and 3. It should be appreciated that the processes, arrangements and products broadly illustrated therein can be carried out on or in accordance with essentially any suitable computer system or set of computer systems, which may, by way of an illustrative and non-restrictive example, include a system or server such as that indicated at 12 in FIG. 1. In accordance with an example embodiment, most if not all of the process steps, components and outputs discussed with respect to FIGS. 2 and 3 can be performed or utilized by way of a processing unit or units and system memory such as those indicated, respectively, at 16 and 28 in FIG. 1, whether on a server computer, a client computer, a node computer in a distributed network, or any combination thereof.

Generally, the creation of audio content continues to evolve for use in new applications. One such application is the World Wide Telecom Web (WWTW), also referred to as the 'Telecom Web' or the 'Spoken Web.' The Spoken Web is a network of VoiceSites hosted on the telecom network, wherein each voice site individually comprises a voice driven application. The Spoken Web system may be viewed as a telecom network parallel to the World Wide Web (WWW) that runs on the Internet infrastructure. VoiceSites are accessed by calling the number associated with the VoiceSite, called a VoiNumber. A VoiLink is used to link the various VoiceSites to one another. A VoiceSite may be created or updated through a voice driven interface, such that a program creator may create a VoiceSite or modify an existing VoiceSite using a cellular phone. The Spoken Web is an ideal solution for a large part of the world were the population does not have access to the devices necessary to access the Internet, but cellular phone penetration is high. As a result, the use of the Spoken Web and the number of VoiceSites continue to increase. Thus, the volume of audio content associated with the Spoken Web continues to steadily expand.

Generally, the World Wide Telecom Web and interconnected voice applications (VoiceSites) and can be accessed by any voice-capable (e.g., landline or cellular) telephone. In the course of an ordinary phone call, the user interacts with a service or other application through speech or DTMF (dual tone multi frequency, or the signal to the phone company that is generated when one presses the touch keys of a telephone).

In accordance with at least one embodiment of the invention, in a voice application with a capability for user generated content (such as VoiceSites), there is broadly contemplated herein a capability for permitting voice commands over a telephone call to let users program or create new software through composition. Such programs can be created in a user's local language, and does not require IT (information technology) literacy or even general literacy as a prerequisite.

Generally, it can be appreciated that steps in a program's lifecycle include the following: program creation through an editor; program compilation into an executable form; and program execution. In the context of a voice application with a capability for user generated content (such as VoiceSites), special challenges are thus presented.

In accordance with at least one embodiment of the invention, one context can be found the voice applications known as VoiceSites, themselves created using SWAF (Spoken Web Application Framework). Background information on SWAF may be found in A. Kumar et al., "The Spoken Web Application Framework User Generated Content and Service Creation through low-end mobiles." In 7th International Cross-Disciplinary Conference on Web Accessibility (W4A; collocated with World Wide Web Conference, 2010).

FIG. 2 schematically illustrates an arrangement for creating a program via a voice-based application, in accordance with at least one embodiment of the invention. Particularly, in accordance with at least one embodiment of the invention, the creation of programs is template driven and thereby facilitated in a constrained fashion. A program editing arrangement is employed at the voice application 202, whereby the user (program creator) 201 selects and configures components desired in the program. (The program may be a meta-VoiceSite application, or another equivalently functioning voice application.) As will be further appreciated herebelow, program creating/editing activity includes the selection of components of the template needed in the program and thereafter filling in properties in the components so as to define the behavior of the components In accordance with at least one embodiment of the invention, a creation step is undertaken wherein the program-creating user 201 calls the voice application (e.g., Spoken Web system) 202 and requests a desired template. The voice application 202 then generates and renders a voice based editing interface for the user (program creator) 201. The program creator 201 obtains components for the template from a component palette 208, whereby options are offered to the creator 201 via voice commands. Here, the creator 201 is presented with options to select desired components from the palette 208 and to configure the properties of the chosen components. "List," "AudioIn," "AudioOut," "NumericIn," and "NumericOut" are shown here, by way of illustration, as examples of components (e.g., as can be made available on VoiceSites) that may be used to construct a template. Each component presents a user interface construct that is rendered appropriately when included in a template. For example, a "NumericIn" component enables an application to accept numeric input from the caller whereas "NumericOut" renders numeric values back to the caller.

The template is further built via employing a control palette 210, a remote procedure calls palette 212 and a voice application palette 214. In a manner to be more fully appreciated herebelow, the program creator 201 thereby creates a customized template instance which includes the specification of the new program (e.g., VoiceSite), and any required functional components (e.g., for SMS functionality) and UI (user interface) components (e.g., prompts in the language used or desired by the user). Accordingly, the template instance represents the compiled program that can be executed.

As shown, in accordance with at least one embodiment of the invention, control palette 210 avails an iteration element, buildable via an iteration module 204. The iteration element can include, by way of illustrative and non-restrictive example, personalized messages and links; the program creator can enable these for any number or group of callers desired. The creator 201 iterates through the personalized messages/links interface and can specify parameters, e.g., a number of times to play personalized messages and links. Generally, the iteration element enables multiple execution of any component. The number of iterations can be user-controlled, that is, an iteration continues until the user decides to exit the loop, or system-controlled, where the number of iterations is pre-specified or predetermined in the system itself.

Further, in accordance with at least one embodiment of the invention, control palette 210 avails a branching element, buildable via a branch module 204. The branching element involves user-controlled branching (controlled by the program user or executor) or system-controlled branching. In user-controlled branching, a menu-based interface is presented to the user (program user or executor), whereby user input determines the portion of a program that executes next. In system-controlled branching, different branching protocols such as conditional branching may be employed. In conditional branching, the values of one or more control variables are relied upon; the variables are either set by the system automatically or are based on user input at different points in program execution. A feature of configuring a personalized message feature involves the insertion of a system controlled branch, whereby a message is played only if there is a message configured by the creator for a predetermined caller, when the caller calls.

In accordance with at least one embodiment of the invention, procedure calls palette 212 avails a procedure calls element, which can be supported for local as well as remote invocations. As an example of a remote procedure call, the sending of an SMS or booking of an appointment can involve invoking a corresponding remote web service. On the other hand, local procedure calls can be made among various functional components that get bundled together to form a template instance.

In accordance with at least one embodiment of the invention, a voice application palette includes a collection of pre-built voice application (e.g., VoiceSite) templates (e.g., available in the platform repository) which can be assimilated and customized to fit user requirements.

FIG. 3 schematically illustrates an arrangement for deploying and executing a program in voice application 202, in accordance with at least one embodiment of the invention. Subsequent to creating the program (e.g., in a manner as described hereinabove with respect to FIG. 2) in a program creation editor module 302, the program is compiled in a compiler 304. A deployer 306 then deploys the program on an application server and assigns a phone number to it. The newly created program can thereafter be accessed using this new number. Execution of the program, in an execution environment 308, is thereby triggered via the arrival of a phone call to the new dedicated phone number. It can be appreciated that, in accordance with at least one embodiment of the invention, execution of a newly created program is automatic and can be performed even within a few minutes of the end of a program-creating phone call.

In accordance with at least one embodiment of the invention, a creator may refine a program (310) through editing. Such editing can include site structure editing, site properties editing and site content editing.

In accordance with at least one embodiment of the invention, in site structure editing, a creator changes the call flow of a site by adding new components, removing or deactivating existing ones and reordering the elements or components. Other actions are possible through site structure editing; these have just been presented as illustrative and non-restrictive examples. In site properties editing, a creator reconfigures properties and owner generated content (e.g., prompts etc.) of the components used to build the site. In site content editing, the creator edits end user content posted on the site. This can include, e.g., moderation of end user content or adding or deleting content, etc.

In recapitulation, it can be appreciated that there are broadly contemplated herein systems and methods which permit users to create programs using a voice interface over a telephone network, using the phone as an access device. The program creation includes requesting a new voice site palette.

In accordance with at least one embodiment of the invention, the voice application (e.g., Spoken Web) generates and renders the voice based editing interface for the program creator. The program creator is presented with options to select desired components from a predefined component library, to be added to the voice application (e.g., VoiceSite) palette. The program creator then configures the properties of the chosen components and can organize the components into a desirable structure. The organization can be undertaken, for instance, by adding an iterator over any of the components selected, and/or making the selected components execute conditionally by adding a conditional to the voice application palette.

In accordance with at least one embodiment of the invention, a compiled program is thereby created which includes the specification of the new program (e.g., VoiceSite) as well as any required functional components (e.g., for SMS functionality) and UI (user interface) components (e.g., appropriate language prompts).

In accordance with at least one embodiment of the invention, the created program is automatically deployed upon user's voice input and is assigned a new and dedicated phone number. The program is finally loaded and executed when an end user calls the given phone number.

In accordance with at least one embodiment of the invention, the program structure can be modified by editing the program in one of the following ways, by way of illustrative and non-restrictive examples: repositioning the components in the sequence; adding or deleting components; and modifying the behavior of the components.

In further recapitulation, it will be appreciated that there are broadly contemplated herein software development processes and arrangements involving program creation, compilation, deployment and access all via voice. Arrangements and processes as broadly contemplated herein can permit non-professionals and non-computer literate (or even non-literate) individuals people to be able to create programs where hindrances to the same may have been present before. Little more is involved than simply conversing via voice or touch-tone with a system over an ordinary cellular or landline phone, as opposed to writing code directly. Typical steps covering the lifecycle of a program are supported, as well as basic programming constructs such as iteration, branches and procedures.

Figure 4:
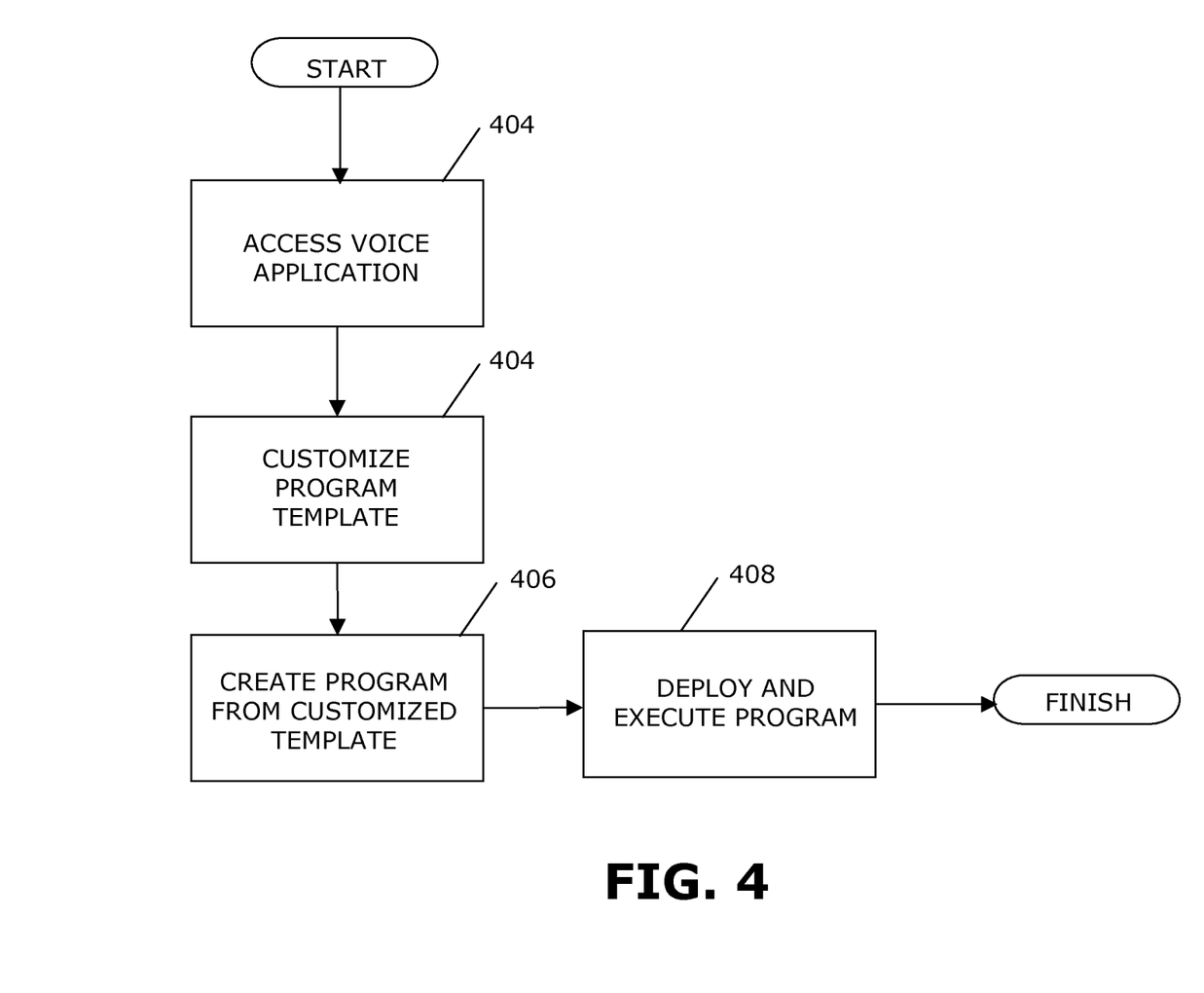
FIG. 4 sets forth a process more generally for employing telephonic voice commands in programming.

FIG. 4 sets forth a process more generally for employing telephonic voice commands in programming. It should be appreciated that a process such as that broadly illustrated in FIG. 4 can be carried out on essentially any suitable computer system or set of computer systems, which may, by way of an illustrative and on-restrictive example, include a system such as that indicated at 12 in FIG. 1. In accordance with an example embodiment, most if not all of the process steps discussed with respect to FIG. 4 can be performed by way of a processing unit or units and system memory such as those indicated, respectively, at 16 and 28 in FIG. 1.

As shown in FIG. 4, a voice application is accessed (402) and a program template is customized via selecting components from one or more palettes (404). A program is created from the customized program template (406), and the created program is deployed and executed.

It should be noted that aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of one or more programming languages, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method comprising:
accessing a voice application through voice interface over a phone call, the voice application including a voice-driven application platform and a plurality of voice-driven application sites;
customizing a program template related to at least one voice-driven application site via selecting components from at least one palette through the voice interface and configuring their properties for desired output;
creating a program from the customized program template, through instructions over the voice interface; and
deploying and executing the created program through instructions over the voice interface.

2. The method according to claim 1, wherein said customizing comprises selecting at least one component from a component palette.

3. The method according to claim 1, wherein said customizing comprises selecting at least one component from a control palette.

4. The method according to claim 3, wherein the control palette includes at least one taken from the group consisting of: an iteration element; and a branching element.

5. The method according to claim 4, wherein:
the control palette includes a branching element; and
the branching element includes at least one taken from the group consisting of: a user-controlled branching element and a system-controlled branching element.

6. The method according to claim 1, wherein said customizing comprises selecting at least one component from a procedure calls palette.

7. The method according to claim 6, wherein the procedure calls palette includes at least one taken from the group consisting of: a remote procedure call element and a local procedure call element.

8. The method according to claim 1, wherein said customizing comprises selecting at least one component from a voice application palette.

9. The method according to claim 1, wherein said deploying comprises assigning a dedicated phone number to the created program.

10. The method according to claim 9, wherein said executing comprises triggering executing of the created program via receipt of a phone call to the dedicated phone number.

11. The method according to claim 1, further comprising refining the created program via at least one taken from the group consisting of: site structure editing, site properties editing and site content editing.

12. The method according to claim 1, wherein:
said accessing comprises accessing a voice application through voice interface over a phone call;
said customizing comprises selecting components from at least one palette through the voice interface and configuring their properties for desired output;
said creating comprises creating a program from the customized program template through instructions over the voice interface; and
said deploying and executing comprises deploying and executing the created program through instructions over the voice interface.

13. An apparatus comprising:
at least one processor; and
a computer readable storage medium having computer readable program code embodied therewith and executable by the at least one processor, the computer readable program code comprising:
computer readable program code configured to access a voice application, the voice application including a voice-driven application platform and a plurality of voice-driven application sites;
computer readable program code configured to customize a program template related to at least one voice-driven application site via selecting components from at least one palette;
computer readable program code configured to create a program from the customized program template; and
computer readable program code configured to deploy and execute the created program.

14. A non-transitory computer program product comprising:
- a computer readable storage medium having computer readable program code embodied therewith, the computer readable program code comprising:
- computer readable program code configured to access a voice application, the voice application including a voice-driven application platform and a plurality of voice-driven application sites;
- computer readable program code configured to customize a program template related to at least one voice-driven application site via selecting components from at least one palette;
- computer readable program code configured to create a program from the customized program template; and
- computer readable program code configured to deploy and execute the created program.

15. The computer program product according to claim 14, wherein said computer readable program code is configured to permit selection of at least one component from a component palette.

16. The computer program product according to claim 14, wherein said computer readable program code is configured to permit selection of at least one component from a control palette.

17. The computer program product according to claim 16, wherein the control palette includes at least one taken from the group consisting of: an iteration element; and a branching element.

18. The computer program product according to claim 16, wherein:
- the control palette includes a branching element; and
- the branching element includes at least one taken from the group consisting of: a user-controlled branching element and a system-controlled branching element.

19. The computer program product according to claim 14, wherein said computer readable program code is configured to permit selection of at least one component from a procedure calls palette.

20. The computer program product according to claim 19, wherein the procedure calls palette includes at least one taken from the group consisting of: a remote procedure call element and a local procedure call element.

21. The computer program product according to claim 14, wherein said computer readable program code is configured to permit selection of at least one component from a voice application palette.

22. The computer program product according to claim 14, wherein said computer readable program code is configured to deploy via assigning a dedicated phone number to the created program.

23. The computer program product according to claim 22, wherein said computer readable program code is configured to trigger execution of the created program via receipt of a phone call to the dedicated phone number.

24. The computer program product according to claim 14, further comprising said computer readable program code is configured to permit refinement of the created program via at least one taken from the group consisting of: site structure editing, site properties editing and site content editing.

25. The computer program product according to claim 14, wherein said computer readable program code is configured to:
- access a voice application through voice interface over a phone call;
- select components from at least one palette through the voice interface and configuring their properties for desired output;
- create a program from the customized program template through instructions over the voice interface; and
- deploy and execute the created program through instructions over the voice interface.

* * * * *